(No Model.) 2 Sheets—Sheet 2.
W. H. WALKER & G. EASTMAN.
ROLLER HOLDER FOR PHOTOGRAPHIC FILMS.
No. 317,049. Patented May 5, 1885.
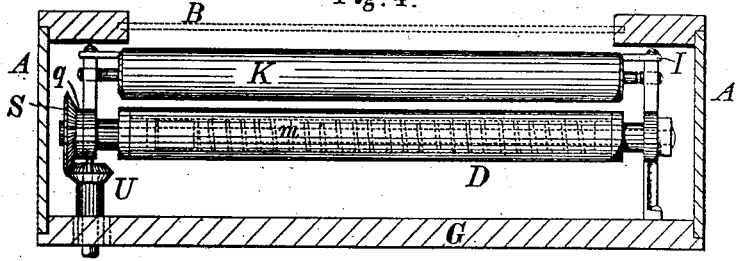
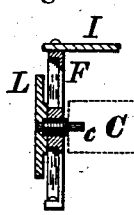
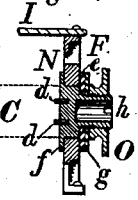
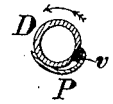
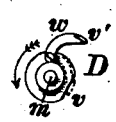
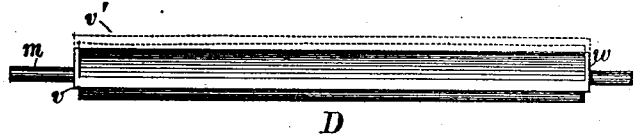
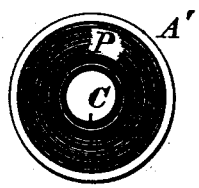
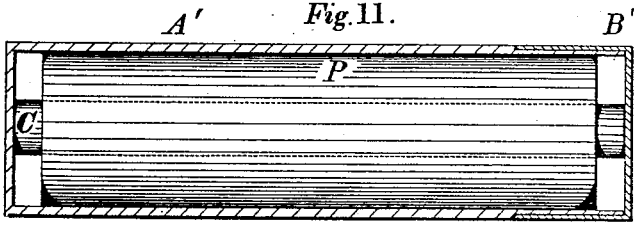
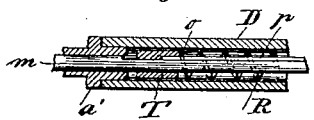
WITNESSES—
H. G. Phillips.
Geo E Sherry
INVENTORS—
Wm H. Walker, and
George Eastman,
by Geo. B. Selden,
Atty.

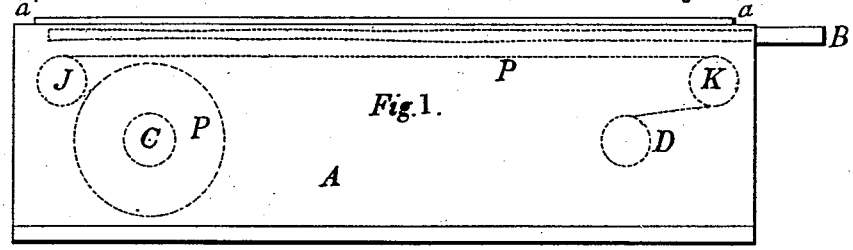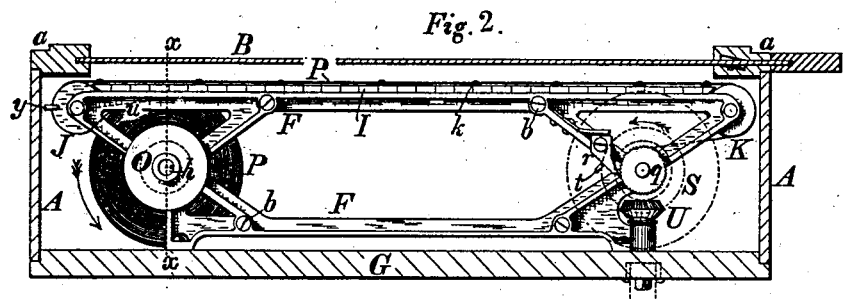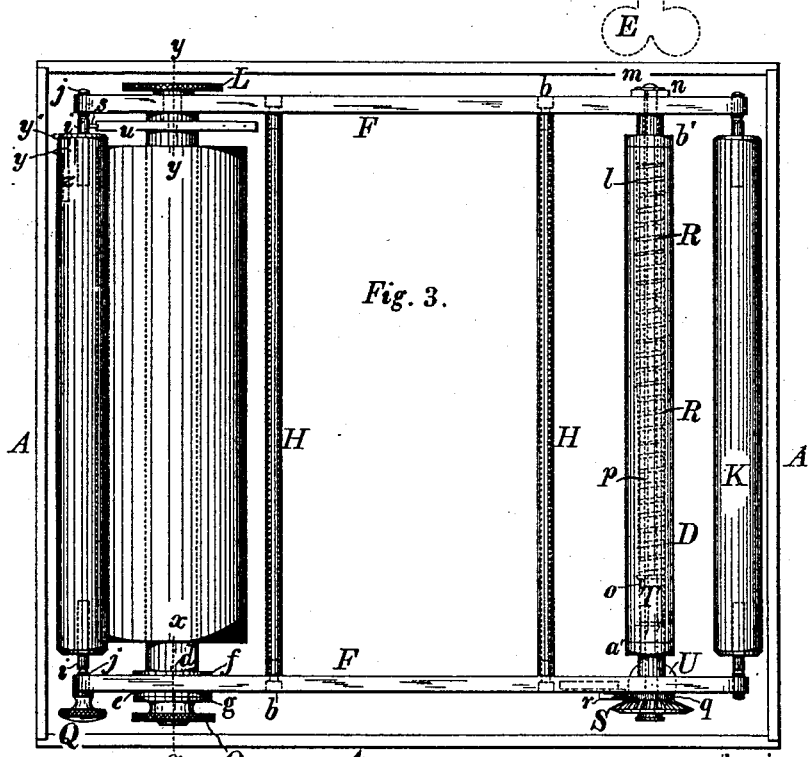

UNITED STATES PATENT OFFICE.

WILLIAM H. WALKER AND GEORGE EASTMAN, OF ROCHESTER, NEW YORK, ASSIGNORS, BY MESNE ASSIGNMENTS, TO THE EASTMAN DRY PLATE AND FILM COMPANY, OF SAME PLACE.

ROLLER-HOLDER FOR PHOTOGRAPHIC FILMS.

SPECIFICATION forming part of Letters Patent No. 317,049, dated May 5, 1885.

Application filed August 8, 1884. (No model.)

*To all whom it may concern:*

Be it known that we, WILLIAM H. WALKER and GEORGE EASTMAN, of Rochester, in the county of Monroe and State of New York, have invented certain Improvements in Roller-Holders for Photographic Films, of which the following is a specification, reference being had to the accompanying drawings.

Our present invention relates to an improved apparatus for exposing sensitive photographic films in the camera, which apparatus is fully described in the accompanying specification and the novel features thereof specified in the claims annexed.

Our improved roller-holder is represented in the accompanying drawings, in which Figure 1 is a plan view. Fig. 2 represents the interior of the holder as seen from above, the side of the inclosing-casing being removed. Fig. 3 is a front view showing the interior of the roller-holder, the shutter and platform or support for the film being removed. Fig. 4 is an end view, one of the ends or sides of the casing being removed. Fig. 5 is a section on the line $x\ x$, Figs. 2 and 3, showing the construction of the friction device of the spool. Fig. 6 is a section on the line $y\ y$, Fig. 3. Fig. 7 is an end view of the reel, showing the device for attaching the end of the film thereto. Fig. 8 is a side view of the same. Fig. 9 is a transverse section through the reel. Fig. 10 is a transverse section through the spool. Fig. 11 is a longitudinal section, and Fig. 12 a transverse section, of a spool wound with film and inclosed in a light-tight case ready for market. Fig. 13 is a sectional view of one end of reel.

Our improved apparatus for exposing flexible films in the camera consists, essentially, of a suitable casing, A A, provided at its front with a rabbet, $a$, by which the holder may be attached to any ordinary camera light-tight, and with an exposing-shutter, B, of the usual type, which casing incloses two rollers, from one to the other of which the film is wound as it is exposed, a suitable frame-work for supporting the rollers in their proper positions, and the other parts of the apparatus.

Our invention also comprises guide-rollers, over which the film passes, alarm and perforating devices, and mechanism for maintaining a sufficient tension of the film.

C represents the roller on which the flexible film is wound before exposure, and which, to distinguish it, we call the "spool."

Our invention also comprises a light-tight case, in which the spools C, filled with film wound thereon, may be delivered to the trade.

D is a roller on which the film is wound after exposure by means of the handle or key E, Fig. 2, which roller we call the "reel." The spool C and the reel D are supported parallel to each other in the frames F F, which are preferably attached to the back G, Fig. 2, which is made removable, so that the whole apparatus may be taken out of the casing for the purpose of removing any exposed films or of introducing a fresh full spool. The frames F F are preferably made of metal in any suitable form adapted to sustain the spool and reel, the platform or support I, over which the film travels, and the guide-rollers J K. The frames are connected together in any suitable way—as, for instance, by the rods H H, which may be, as shown in the drawings, tubes attached at either end to the frames by the screws $b\ b$.

As the spool C is designed to be used only once, we prefer to make it of wood, and to provide it at one end with a single central hole which receives the stud or pin $c$, Fig. 6, while at the other end the spool contains two holes, into which the pins $d\ d$, attached to the brake or friction device, are inserted. The body of the pin $c$ is threaded and screws into a hole in the frame, being provided with the milled head L, Fig. 6. Provision is thus made for removing an empty spool and replacing it by a spool full of unexposed film.

The construction of the brake or friction device on the spool will be readily understood from the sectional view, Fig. 5.

N is a collar carrying the pins $d\ d$, which revolves in a suitable recess or bearing in the frame, being provided on the inside of the frame with a flange, $f$. A hub projecting from the collar outside of the frame is threaded, and has the clamp-nut O fitted thereon. Between the inner surface of the clamp-nut and the frame are placed the washer $g$ and the collar $e$, of leather or other suitable material. By screwing up the nut O any desired amount of friction may be produced, and the collar N and spool C caused to revolve with a suitable resistance to turning. The collar N may be provided with a recess, $h$, adapted to receive a key or other suitable device for turning the spool C, if desired. The end of the film may be attached to the spool C in any convenient way; but in practice we have adopted the exceedingly simple plan of cutting a narrow groove, $e'$, Fig. 10, lengthwise in the surface of the spool, and of fastening the film therein by glue or other cement. The film P is attached to the spool C and reel D, so that by turning the reel it is drawn along from the spool about the guide-roller J, passes in front of the support I, and thence around the guide-roll K to the reel. The guide-roll J may be made of any suitable material; but we prefer to make it of wood for the sake of lightness, in which case it is provided with the pins $i\ i$, which revolve on the centers $j\ j$, inserted in the frame, one of which is made removable and provided with a thumb-nut, Q, Fig. 3. The support I is a flat plate of any suitable material. In the drawings it is represented as made of strips of wood secured to the frame by the screws $k\ k$, which project a short distance beyond the support, and by coming in contact with the interior of the casing prevent accidental injury to the film when the apparatus is being inserted or removed. The back G is attached to the casing by screws or any suitable hooks or catches. The film-support I also answers as a septum or division-plate to prevent the access of light to the film wound on the spool C or reel D. The guide-roller K is sustained in the frame at the opposite end of the support I by means similar to those already described for the roller J.

The reel D is hollow, being provided in its interior with a spring, R, which serves to maintain a sufficient tension on the film. The reel is supported on a shaft, $m$, Fig. 3, which passes through suitable journals in the frames F F, and is provided at one end with the bevel-gear S, and at the other end with the removable collar $n$, attached to the shaft by a pin or other suitable device.

The reel D, which consists, preferably, of a metallic tube, is provided at each end with collars $a'\ b'$, which are free to revolve on the shaft $m$.

Within the reel D is placed the spiral spring R, one end of which is attached at $l$ to the reel or the reel-collar, while the other end is fastened at $o$ to the sliding collar T, which is splined onto the reel-shaft $m$, so as to revolve therewith, being left free to slide endwise thereon. On turning the reel-shaft $m$ the spring R is compressed until its tension is greater than the resistance of the friction on the spool C, and when this occurs the film P will be drawn along in front of the support I, unwound from the spool and wound onto t[he] reel. A slot, $p$, Fig. 3, is planed in the sha[ft] $m$, and the collar T is provided with a proje[c]tion or lug, which slides endwise in the slo[t]. The shaft $m$ may be removed from the app[a]ratus by taking off the collar $n$ and drawing lengthwise through the reel and the journa[ls] in the frames.

In order to maintain the proper tension o[f] the film the shaft $m$ is provided at one e[nd] with a ratchet, $q$, Figs. 2 and 3, into the tee[th] of which the spring-pawl $r$, pivoted to t[he] frame, engages, so as to prevent the spring from uncoiling. A suitable tension is th[us] always maintained on the film by an elast[ic] spring, which yields to permit any contracti[on] or expansion of the film due to varying cond[i]tions of moisture in the atmosphere.

The bevel-gear S is omitted in Fig. 2 of t[he] drawings in order to show the ratchet a[nd] spring-pawl, its position being indicated [by] the dotted circles. The pawl $r$ is provid[ed] with an extension or arm, $t$, by pressing [on] which its point may be disengaged from t[he] teeth of the rachet, if at any time it be d[e]sired to turn the reel backward, or from le[ft] to right in Fig. 3.

It is obvious that any suitable friction d[e]vice may be substituted for the ratchet a[nd] pawl $q\ r$ for the purpose of preventing t[he] rotation of the shaft $m$, the same being a[r]ranged to be thrown out of action when d[e]sired. The bevel-gear S on the reel-sha[ft] meshes with the bevel-pinion U, which is su[p]ported in a suitable bearing attached to t[he] frame or the back G, and is provided wi[th] a squared stud to receive the removable k[ey] E, by which motion is imparted to the re[el] D. In the smaller sizes of holders the gea[rs] may be dispensed with, the end of the sh[aft] $m$ being arranged to receive a removable k[ey] or other device by which the reel is revolve[d].

The film is attached to the reel D by mea[ns] of the swinging clip $v$, which is shown op[en] at $v'$ and closed at $v$ in Figs. 7 and 8. A fl[at] place is formed in the side of the reel, and t[he] bar or clip $v$, which swings on arms $w\ w$, pi[v]oted to the ends of the reel, clamps the film [to] the reel. The arrangement will be und[er]stood from the sectional view, Fig. 9, in whi[ch] the end of the film is bent over the edge of t[he] clip in such direction that turning the reel [so] as to unwind the film from the spool C dra[ws] the clip firmly down against the flatten[ed] side of the reel and clamps the film firm[ly] thereto. It will also be observed that the fi[lm] is wound onto the reel in such a direction th[at] the chemical side is inward, thereby affordi[ng] protection from injury to the film.

The gears are used for the purpose of e[n]abling the operator to manipulate the fi[lm] from the back of the holder, as it would be [de]cidedly inconvenient to work from the top [of] large sizes. Provision should be made to p[re]vent the access of light to the interior of t[he] holder at the point where the key is appli[ed] to the pinion or reel shaft.

The devices by which we measure the proper length of film for each exposure, and by which we indicate the proper points to divide the separate exposures from each other, remain to be described. We measure the proper length of the film for each exposure by causing a pin, s, Fig. 3, on the guide-roller J or K to strike against a spring, u, which, when released from the point of the pin, recoils and strikes against the frame, support, or casing, causing a sharp snapping noise, or succession of snaps, which attract the attention of the operator and warn him that he has drawn enough film from the spool for the next exposure. The diameter of the guide-roll J is proportioned to the length of the film to be exposed; thus for a ten-inch exposure it is convenient to make the guide-roll four-fifths of an inch in diameter, so that four times its circumference will be ten inches. The operator will in this case turn the reel D until he hears four snaps caused by the spring u, when he knows that the desired length of film has been drawn along in front of the support I. In a similar manner the size of the guide-roll may be proportioned to any desired length of film to be exposed, being made to revolve any preferred number of times. The pin s may be carried by a gear-wheel meshing with a pinion on the guide-roll, arranged to give the gear but one revolution for as many turns of the roller as may be required to measure the desired length of film, in which case the operator will stop turning the reel when he hears the first snap.

In the drawings we have represented the spring u as attached to the rear side of the support I, and arranged to strike against the same when released from the pin s.

In order to indicate the places at which those portions of the film which have been separately exposed should be divided, we employ on one of the guide-rollers the marking device y, which consists of a point projecting from the roller and operating to perforate or mark the film near its edge at each revolution. With the size of roller J, already mentioned, the film would require to be divided at every fourth mark.

The marking device may be a simple point of suitable length fixed in the roller; but we prefer to arrange it to slide endwise in the roll, its shank z being inserted in a hole bored longitudinally therein, so that it can be removed entirely or slid outside of the edge, as at y', Fig. 3, of the film, in order to avoid marking the film in reeling it back from the reel to the spool.

In cases where it is desired to remove the film without dividing it, it can be reeled back onto the spool and the spool taken out with the exposed film thereon.

The operation of our improved roller-holder for photographic films will have been already understood from the foregoing description. The spool of film having been inserted in the holder and the roller J being in place, the operator passes the film over the support I and attaches its end to the reel D by means of the clip v. The holder is now ready to be used in making exposures in the camera. After each exposure the operator turns the key E until the spring u warns him by the noise of its recoil that he has drawn a sufficient length of film from the spool. On returning to his darkroom the exposed parts of the film are separated from the unused portion, the end of the latter being again attached to the reel, when the holder is ready for other exposures, and so on until the spool of film is entirely exhausted. The tension device serves to roll the film tightly on the reel, thereby avoiding abrasion, and in rewinding from the reel onto the spool a sufficient tension may be secured by pressing the hand against the back of the film on the reel; or a friction device may be applied to the reel if desired, it being understood that the operation of rewinding, if necessary, is performed in the dark-room.

In Figs. 11 and 12 we have represented a spool full of flexible sensitive photographic film attached to the removable spool which we design to employ in our improved roller-holder and inclosed in a light-tight case.

The drawings show the manner of preparing the films for the market, so that they may be transported from place to place without suffering injury.

The spool C is provided at each end with suitable means for attaching it to the journals in the roller-holder, so that it may be supported and allowed to revolve therein, which means may consist of the recesses in the ends of the spool and the pins c d, as hereinbefore described. The inner end of the film P is attached to the spool by being inserted in a groove and fastened or attached in any other suitable manner, and the film is preferably wound on the spool with its sensitized side inward. The spool with the film wound thereon is inclosed in a suitable light-tight case or wrapper, A', which, as shown in the drawings, may consist of a round straw-board or pasteboard box having a removable cap or end, B', in which condition the film is delivered to the trade.

It is obvious that many modifications may be made in the form of spool employed and in the means of attaching it to the holder. Thus the spool may be tubular, arranged to slide over a suitable spindle or journal in the holder, and connected in any suitable manner with its operating devices.

Any kind of flexible sensitive photographic film may be prepared for use in roller-holders in accordance with our improvements, as herein described.

We claim—

1. The combination, in an apparatus for exposing sensitive flexible photographic films, of two parallel rollers for operating the film, one of which is provided with a brake or friction device, while the other has applied to it a spring, which maintains the film in tension, substantially as described.

2. The combination, with the frame F F, of the spool C, having friction device applied thereto, film-support I, reel D, spring R, and ratchet and pawl q r, substantially as described.

3. The combination, in a roller-holder for exposing photographic films, of the spool C, reel D, film-support I, and guide-rollers J and K, with a device acting to maintain the film in a tense condition during exposure, substantially as described.

4. In a roller-holder for exposing photographic films, the reel D, provided with swinging clip v, for fastening the end of the film to the reel, substantially as described.

5. The combination, with the reel D, provided with means for attaching the film thereto, of the shaft m, spring R, and collar T, substantially as described.

6. The combination, with the reel D, provided with means for attaching the film thereto, and for preventing the reverse motion of the reel, of the shaft m, spring R, and collar T, substantially as described.

7. The combination, in a roller-holder for exposing photographic films, of the spool C, film-support I, reel D, and bevel-gears S U, substantially as described.

8. The combination, with the casing A, adapted to be attached to a camera, and provided with the exposing-shutter B, of the removable back G, carrying the frames F F', spool C, film-support I, and reel D, substantially as described.

9. In a roller-holder for exposing photographic films, and in combination with the spool and reel, as described, a measuring-roll in contact with the film, and provided with an alarm device, in combination with a film-support and devices for feeding the film across said support and roller, substantially as described.

10. The combination, in a roller-holder for exposing photographic films, of the measuring-roll J, provided with lug or pin s, and the spring u, arranged to operate substantially as and for the purposes set forth.

11. The combination, in a roller-holder for exposing flexible photographic films, of the measuring-roll J and removable film-marking point y, substantially as described.

12. The combination, with the measuring-roll J, of the film-marking point y, arranged to be adjusted lengthwise of the roll, substantially as described.

13. The combination, with a roller-holder for exposing photographic films, of a measuring-roll in contact with the film, and provided with an alarm attachment and a film-marking device, substantially as described.

14. The combination, in a roller-holder for exposing photographic films, of the spool C, pins c and d d, collar N, and nut O, substantially as described.

15. The combination, in a roller-holder for exposing photographic films, of the spool C, pins c and d d, collar N, nut O, reel D, spring R, shaft m, and pawl and racthet q r, substantially as described.

16. In a roller-holder, the removable film carrying spool C, provided at its end with means for attaching it to a revolving journ provided with a friction device, substantial as described.

17. In a roller-holder, the removable film carrying spool C, provided on its ends with recesses for the reception of the pins c and d, and slot e', substantially as described.

18. The combination, with the casing A adapted to be attached to a camera, and provided with the exposing-shutter B, of the removable back G, carrying the frames F F spool C, guide-rolls J and K, and reel D, substantially as described.

19. As a new article of manufacture, the herein-described roll of flexible sensitive photographic film, having its inner end attached t a spool, provided with means for inserting the spool and roll in a roller-holder, and inclose in a suitable light-tight case or wrapper, substantially as described.

20. The combination, with spool C, reel D and guide-rollers J K, arranged substantiall as described, of the flexible photographic film wound upon the spool and reel with its sens tized face inward and passing over rollers K, with its sensitized face outward, substan tially as indicated.

21. In combination with the light-excluding case and the roller or reel for winding the film after exposure, arranged within said case the devices for actuating said reel from the exterior of the case, and a tension-regulator in termediate the actuating devices and reel whereby in winding the film upon the reel the power is transmitted to the latter through the said tension-regulator, substantially as an for the purpose described.

22. In combination with the spool carryin the film-supply, a yielding brake mechanisi applied thereto, a winding-reel and actuatin mechanism therefor, an elastic tension devic intermediate the reel and its actuating mecl anism, substantially as described.

23. In a photographic-film holder, and i combination with the inclosing-case, film-sup ply spool and winding-reel, a brake applie to the spool, a tension device applied to th reel, and an actuating device having a deter and operating through the tension device t turn the reel, substantially as described.

24. In a photographic-film holder, and i combination with the light-excluding case pre vided with a shutter, as described, the remov able back, and the film carrying and reelin mechanism supported wholly upon said bacl whereby the reeling and carrying devices ma be withdrawn from the case to facilitate th operations of removing the film after exposui and inserting a new film, substantially as de scribed.

25. In a photographic-film holder, and i combination with the inclosing-case and th reel D, provided with means for detachabl securing the end of the film, the spool C, grooved as described, and the film wound upon said spool with its end inserted and fastened within the groove therein, substantially as described.

26. In a photographic-film holder, and in combination with its inclosing-case, a film carrying and straining mechanism independently mounted and inserted within the said case and removably attached thereto, substantially as described.

27. In a photographic-film holder, and in combination with the inclosing-case, a spool carrying the sensitized film, a reel for unwinding the film from the spool and winding it up after exposure, and an adjustable friction-brake applied to said spool, whereby the degree of tension to which the film will be subjected when drawn from the spool is determined, substantially as described.

28. As a new article of manufacture, the herein-described roll of flexible sensitive photographic film consisting, essentially, of a spool provided with means for detachably applying it to a holder, and a strip or roll of flexible sensitive film attached at one end to the spool and wound with its sensitive face inward, substantially as described.

29. In a photographic-film holder, and in combination with a film-supply holder, and a feeding mechanism for transferring the film from the holder and into position for exposure, a tension-regulator applied to the film and acting to supplement the pull of the feeding mechanism, substantially as described.

30. In a photographic holder wherein are embodied an inclosing-case with exposing-aperture, a film-supply holder, and a feeding mechanism such as indicated, and in combination with said supply-holder and feeding mechanism, a supplemental tension-regulator applied to the film and operating, after the requisite feed has been effected, to maintain a constant pull upon the film lying between the supports and in front of the exposing-aperture, substantially as described.

31. In a photographic holder, and in combination with a film-supply holder and a feeding mechanism for withdrawing a portion of the film from the holder and sustaining it in position during exposure, a brake affording a determined resistance to the pull of the feeding mechanism, a detent for preventing the recoil of the feeding mechanism, and a tension device acting upon the film to supplement the action of the feeding device and produce a tension of the film, substantially as described.

32. In a photographic-film holder such as described, and in combination with the film carrying and feeding devices, an elastic tension-regulator adapted to draw upon and strain the film between its supports and to continue such action during the feeding of the film and independently of the feeding devices, substantially as described.

33. The combination, with the spool carrying the film-supply, the reel, and a spindle for actuating the reel, an elastic tension-regulator intermediate the said spindle and reel, whereby the motion to feed the film is transmitted through the said tension device, substantially as described.

34. In a photographic holder such as described, and in combination with a device for holding the film-supply, a winding-reel to which one end of the film is attached, and an elastic tension device applied to said reel and operating to rotate the latter, substantially as described.

35. In a photographic-film holder, and in combination with its inclosing case and shutter, a frame detachably secured within said case, and provided with bearings to receive the detachable film-supply spool and reel, substantially as described.

36. In a photographic-film holder, and in combination with its light-excluding case provided with a shutter, as described, a removable frame inserted within said case and provided with a film-support, guide-rollers, and adjustable bearings at either end to receive the detachable spool and reel, whereby the entire film holding and actuating mechanism can be detached from its inclosing-case and held in operative position for adjustment, removal, or inspection, substantially as described.

WM. H. WALKER.
GEORGE EASTMAN.

Witnesses:
GEO. B. SELDEN,
H. G. PHILLIPS.